Figure 1:
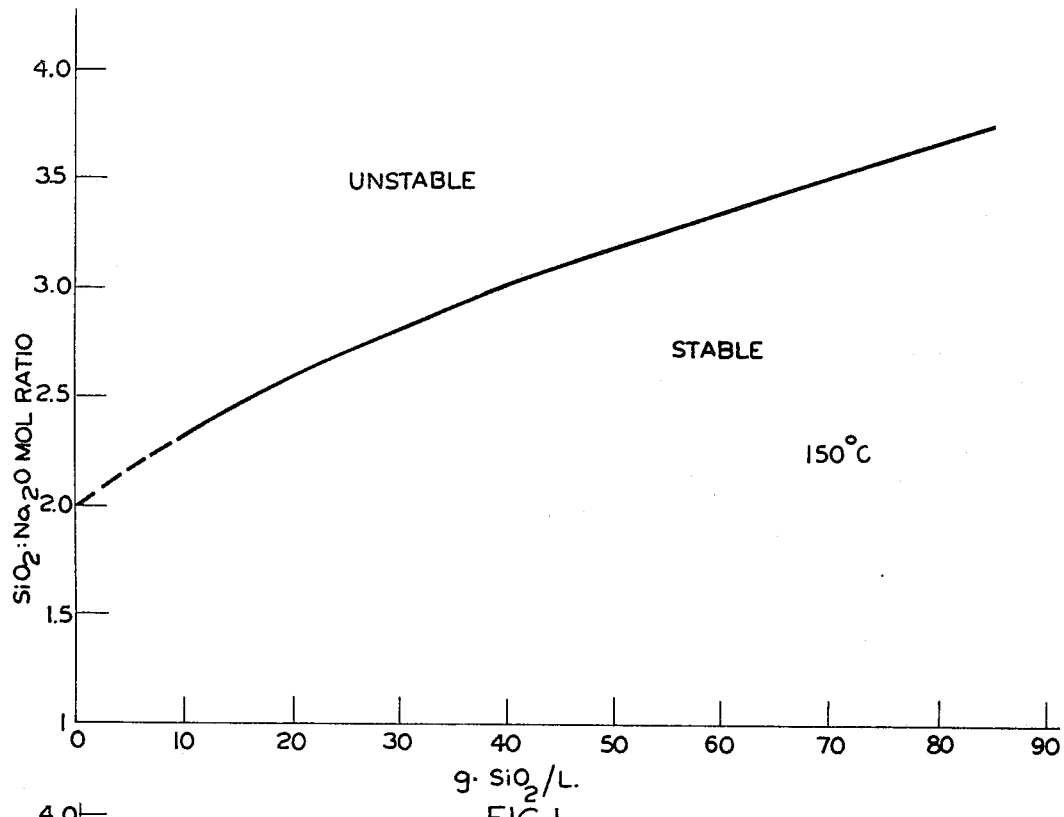

３,397,950
PROCESS FOR PREPARING SOLUTIONS FOR
TELEVISION SCREENS
Roland Schnürch, Dusseldorf-Holthausen, and Alfred Köster and Helmut V. Freyhold, Dusseldorf-Oberkassel, Germany, assignors to Philadelphia Quartz Company, Philadelphia, Pa., a corporation of Pennsylvania
Filed Mar. 8, 1965, Ser. No. 437,648
Claims priority, application Germany, Mar. 19, 1964, H 52,101
5 Claims. (Cl. 23—110)

This invention pertains to a process for the preparation of improved alkali metal silicate solutions for use in the manufacture of television screens.

Alkali metal silicate solutions for the preparation of television screens are well known. In general, a television screen is prepared by adding a solution of an alkali silicate, preferably a potassium silicate, and an electrolyte solution, for example a barium nitrate solution, to an aqueous suspension of a phosphor. A precipitate of particles containing silica and barium, for instance, is formed which settles to the bottom together with the phosphors. It is supposed that crosslinking of the silicic acid causes the particles to adhere to each other and to the surface of the glass. The supernatant liquid is poured off after a short time, ordinarily after about 15 to 20 minutes. The phosphor layer adhering to the bottom of the glass must not be damaged during this process of pouring off the supernatant liquid. In other words, the film on the bottom of the glass must have sufficient wet strength to resist the strains caused by the removal of the supernatant liquid. Very often it is found that when using ordinary technical waterglass solutions the wet strength varies widely despite the fact that the conditions of preparation and use are kept constant.

Several processes for the improvement of wet strength of the phosphor film have been suggested. These include the treatment of the alkali metal, preferably potassium, silicate solutions with soluble metal salts or peroxides generally followed by a thermal treatment and filtration. All of these known processes require additional steps and introduce additional dissolved impurities into the filtered alkali metal silicate solution.

It has been found that surprisingly enough, even without the use of additives, alkali metal silicate solutions producing screens of good wet strength can be obtained by the process described below. This new process for the preparation of alkali metal silicate solutions for use in the preparation of television screens comprises the treatment of solid alkali metal silicates having a mole ratio of $SiO_2:Me_2O$ (Me=alkali metal) of about 2.3:1 to about 4.5:1 with water at temperatures above about 90° C. The ratio of solid alkali metal silicate to water required depends upon the mole ratio of silica to alkali metal oxide of the silicate solution and increases with increasing mole ratio. This ratio is adjusted so that the alkali metal silicate solution formed under the instant conditions (assuming complete solubility) does not contain more than about 165 grams of $SiO_2$ per liter of solution, preferably about 10 to about 100 grams of $SiO_2$ per liter. The solution obtained in this way is filtered and, if necessary, adjusted with alkali metal hydroxide to the desired mole ratio of $SiO_2:Me_2O$.

It is essential to the development of good wet strength that diluted alkali metal silicate solutions are used in this new process. If the mole ratio is increased, the concentration of the silicate may also be increased. The weight ratio of solid alkali metal silicate to water must be adjusted, assuming that the dissolving is complete, in such a way that alkali metal silicate solutions are obtained which fall in the region above the dividing line shown in FIGURES 1 and 2. By the use of these figures it is easily possible to pick out the maximum concentration permitted. This maximum concentration varies somewhat depending on the cation and the working temperatures.

Figure 2:
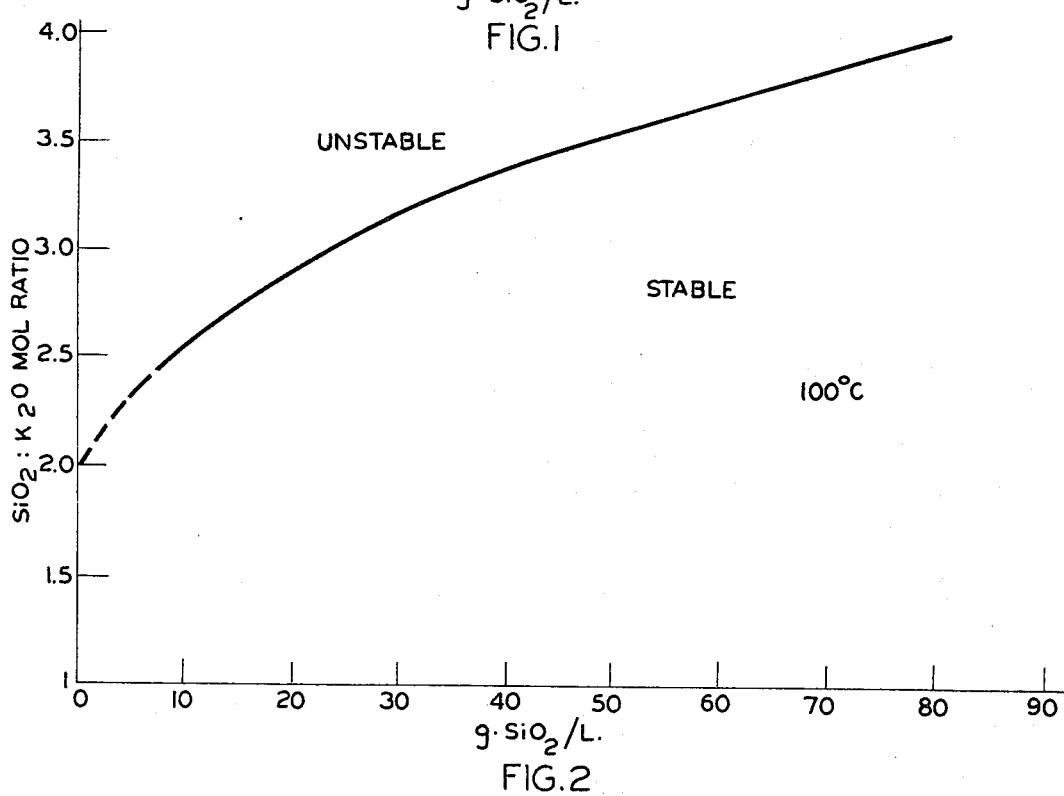

FIGURE 1 shows the regions of stability and instability at about 150° C. for sodium silicate solutions having molecular ratios ranging from 1.0 to 4.5 $SiO_2:Na_2O$ and at concentrations from 10 to 90 grams of $SiO_2$ per liter with the dividing line extrapolated from 10 down to about 1 gram per liter as shown by the broken line. FIGURE 2 shows the same regions at about 100° C. for potassium silicate solutions.

In general, it is advantageous to start with solid alkali metal silicates having a high ratio of silica to metal oxide. Thus it is preferable to use alkali metal silicates having a mole ratio of about 4.0:1 to about 4.3:1. Under these conditions the wet strength has been found to be unusually good.

The time required for heating the silicate solution depends upon the temperature employed and, to a certain degree, upon the particle size of the solid alkali metal silicate being treated. When heating under reflux the reaction time is about 3 to 6 hours but this can be shortened considerably by increasing the temperature. The advantage of working under reflux temperatures is that pressure vessels are not required. It is, however, often advantageous for technical reasons to use higher temperatures such as about 140 to 160° C. and a heating time of about 0.5 to 3 hours in a vessel under pressure. In these cases the heating can be done directly or indirectly by introduction of steam. The most advantageous time at any given temperature is easily estimated by simple test runs.

Alkali metal silicate solutions obtained by the process of this invention may be filtered in a conventional manner and, if necessary, adjusted with alkali metal hydroxide to the desired mole ratio. For the purpose of producing television screens, alkali metal silicate solutions having ratios of $SiO_2$ to alkali metal oxide in the range of about 3.0:1 to 4.0:1, and especially in the range of about 3.1:1 to 3.5:1, are preferred. It is, of course, possible to select a proper mole ratio of alkali metal silicate to start with, or the original alkali metal silicate may be adjusted by the addition of alkali metal hydroxide so that the final solution has the desired composition. The addition of alkali metal hydroxide must be carried out so that the weight ratios of water to alkali metal silicate, mentioned above, as well as the corresponding mole ratios of alkali metal silicate are maintained.

The following examples are given for the purpose of illustrating the invention and include the best-known mode for carrying out the process of this invention. They are not to be construed as limiting the invention which is defined in the claims.

EXAMPLE 1

Solid potassium silicate having a mole ratio of $SiO_2:K_2O$ of 4.2:1 and containing 72.6% of $SiO_2$ was mixed with 3.44 parts by weight of water per part by weight of silica. The mixture was heated under reflux for six hours with stirring. After filtration a potassium silicate solution was obtained having a mole ratio of 4.17:1 which was adjusted to the mole ratio 3.5:1 and a concentration of 70 grams of $SiO_2$ per liter by the addition of a solution of potassium hydroxide.

In a further batch, solid potassium silicate was heated with water in the same way as described in the previous paragraph except that 11.1 parts by weight of water were used per part of silica. After filtration, a solution with a mole ratio of 3.96:1 was obtained. This alkali metal silicate solution was adjusted with potassium hydroxide to a mole ratio of 3.5:1 and a concentration of 70 grams of $SiO_2$ per liter.

To obtain comparative values, the following test method was used to determine wet strength:

| | Ml. |
|---|---|
| Barium nitrate solution (0.002 molar) | 100 |
| Potassium waterglass solution (70 g./l. $SiO_2$) | 10 |
| Phosphor suspension (3 g. phosphor/100 ml. $H_2O$) | 9.4 | were mixed together and poured into a crystallization dish. The crystallization dish was treated for 0.5 hour before each measurement with 10% hydrofluoric acid, rinsed with distilled water, and dried. In the crystallization dish the same process that occurs during the preparation of a television screen takes place. The phosphor together with any precipitate settles to the bottom of the dish and a film forms which increases in strength as it ages. The wet strength of the film is measured after 30 minutes settling time by shooting a defined jet of water below the surface of the water onto the film surface. This jet removes the film at the point of impact and, after a certain time, a circular hole is formed. The diameter of this hole in millimeters is taken as a measure of wet strength. The defined water jet is produced by a capillary whose tip is 1 cm. from the bottom of the crystallization dish below the surface of the water. The capillary is connected to an overflow reservoir. The vertical distance between overflow and tip of the capillary is 1 mm. The delivery rate of this setup is 42–45 mls. per 50 seconds. For each measurement, a flow time of 5 seconds is used.

The wet strength of the potassium silicate solution described in the first paragraph of this example, by this method gave a hole diameter of about 7 mm. as compared to 2.5–2.75 mm. for the alkali metal silicate solution prepared in the second paragraph of this example.

An improvement of more than 50% in wet strength was obtained by the process of the invention.

EXAMPLE 2

Potassium silicate glass of Example 1 was mixed with 18.7 parts by weight of water per part by weight of silica. This batch was heated with stirring to boiling temperature for six hours. After filtration an alkali metal silicate solution was obtained with a mole ratio of 3.48:1. The concentration was adjusted to 70 grams of $SiO_2$ per liter by evaporation in vacuo. Good screen wet strength was obtained. The hole diameter was 2.75 mm.

EXAMPLE 3

Solid potassium silicate of Example 1 was refluxed together with 11.1 parts by weight of water and 0.1 part by weight of 50% potassium hydroxide solution for six hours. After filtration a residual potassium silicate solution with a mole ratio of 3.69:1 was obtained. This solution was mixed with further potassium hydroxide solution to give a mole ratio of $SiO_2$:$K_2O$ of 3.47:1 and a concentration of 70 grams of $SiO_2$ per liter. Good screen wet strength was obtained. The hole diameter was 3 mm.

EXAMPLE 4

Potassium silicate glass with a mole ratio of $SiO_2$:$K_2O$ of 4.21:1 and 72.44% silica content was mixed with 12.5 parts by weight of water per part by weight of silica and heated in a rotating autoclave to 145° C. for 1.5 hours. The solution was filtered and the residual alkali metal silicate solution obtained having a mole ratio of 3.87:1 was evaporated in vacuo and then mixed with 50% potassium hydroxide solution to give a commercial solution containing 19.15% silica and having a mole ratio of $SiO_2$:$K_2O$ of 3.45:1. This alkali metal silicate solution was diluted to 70 grams of $SiO_2$ per liter before it was used for the preparation of television screens. Good wet strength was obtained. The hole diameter was 2.5 mm.

EXAMPLE 5

Potassium silicate glass with a mole ratio of $SiO_2$:$K_2O$ of 3.37:1 was mixed with 12.5 parts by weight of water per part by weight of silica and heated in a rotating autoclave for 1.5 hours at 145° C. The alkali metal silicate solution was filtered and had a mole ratio of 3.26:1; it was diluted with water to 70 grams of $SiO_2$ per liter. This alkali metal silicate solution together with electrolyte solution and phosphor gave good wet strength. The hole diameter was 3 mm.

More or less detailed claims will be presented hereinafter, and even though such claims are rather specific in nature, those skilled in the art to which this invention pertains will recognize that there are obvious equivalents for the specific materials recited therein. Some of these obvious equivalents are disclosed herein, other obvious equivalents will immediately occur to one skilled in the art, and still other obvious equivalents could be readily ascertained upon rather simple, routine non-inventive experimentation. Certainly no invention would be involved in substituting one or more of such obvious equivalents for the material specifically recited in the claims. It is intended that all such obvious equivalents be encompassed within the scope of this invention and patent grant in accordance with the well-known doctrine of equivalents as well as changed proportions of the ingredients which do not render the composition unsuitable for the disclosed purposes. Therefore, this application for Letters Patent is intended to cover all such modifications, changes and substitutions as would reasonably fall within the scope of the appended claims.

What is claimed is:

1. A process for the preparation of a potassium silicate solution that is especially useful as a coating component for television screens which comprises the steps of:
   (a) obtaining a solid potassium silicate having a $SiO_2$:$K_2O$ mol ratio between about 4.0:1 and 4.3:1,
   (b) admixing said potassium silicate with water,
   (c) heating the potassium silicate and water above about 90° C.,
   (d) adding sufficient potassium hydroxide to bring the $SiO_2$:$K_2O$ mol ratio within the range of 3.0:1 and 4.0 to 1.
   (e) maintaining sufficient water in the aqueous potassium silicate so that the concentration does not exceed 165 grams of $SiO_2$ per liter of solution,
   (f) recovering a treated potassium silicate,
   (g) said mol ratio and said concentration being correlated so that operations are above the curve in FIGURE 2.

2. A process according to claim 1, wherein the concentration is maintained between 10 and 100 grams of $SiO_2$ per liter of solution.

3. A process according to claim 1, wherein the heating is under reflux for between about 3 and 6 hours.

4. A process according to claim 1, which comprises heating under pressure at a temperature above about 100° C.

5. A process according to claim 4, wherein the temperature is between about 130° C. and 200° C.

References Cited

UNITED STATES PATENTS

| 2,784,060 | 3/1957 | Santmyers | 23—110 |
| 3,077,389 | 2/1963 | Schulze et al. | 23—110 X |

OSCAR R. VERTIZ, *Primary Examiner.*

A. J. GREIF, *Assistant Examiner.*